US009335948B1

(12) United States Patent
Kirac et al.

(10) Patent No.: US 9,335,948 B1
(45) Date of Patent: May 10, 2016

(54) METHOD AND APPARATUS FOR ENABLING ACCESS TO TIERED SHARED STORAGE USING DYNAMIC TIER PARTITIONING

(75) Inventors: Ahmet Kirac, Guttenberg, NJ (US);
Adnan Sahin, Needham, MA (US);
Marik Marshak, Newton, MA (US);
Amnon Naamad, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 224 days.

(21) Appl. No.: 13/431,071

(22) Filed: Mar. 27, 2012

(51) Int. Cl.
*G06F 3/06* (2006.01)

(52) U.S. Cl.
CPC ............ *G06F 3/0649* (2013.01); *G06F 3/0631* (2013.01); *G06F 3/0685* (2013.01)

(58) Field of Classification Search
CPC .... G06F 3/0685; G06F 12/08; G06F 12/0871
USPC ......................................................... 711/117
See application file for complete search history.

(56) References Cited

U.S. PATENT DOCUMENTS

| | | | | |
|---|---|---|---|---|
| 7,454,446 B2 * | 11/2008 | Leung et al. | | |
| 7,734,888 B1 * | 6/2010 | Hamilton et al. | ............. | 711/170 |
| 7,899,989 B2 * | 3/2011 | Moore et al. | ................... | 711/170 |
| 8,370,597 B1 * | 2/2013 | Chatterjee et al. | ............ | 711/114 |
| 8,566,546 B1 * | 10/2013 | Marshak et al. | ............... | 711/165 |
| 8,621,178 B1 * | 12/2013 | Lazar | ............................. | 711/173 |
| 2003/0140207 A1 * | 7/2003 | Nagase et al. | ................ | 711/167 |
| 2004/0230753 A1 * | 11/2004 | Amiri et al. | ................... | 711/147 |
| 2006/0288159 A1 * | 12/2006 | Haruna et al. | ................ | 711/113 |
| 2009/0016220 A1 * | 1/2009 | Uysal et al. | ................... | 370/232 |
| 2009/0276588 A1 * | 11/2009 | Murase | .......................... | 711/160 |
| 2011/0185120 A1 * | 7/2011 | Jess | ................................ | 711/117 |
| 2012/0317355 A1 * | 12/2012 | Ishizaki et al. | ................ | 711/114 |

* cited by examiner

*Primary Examiner* — Christian P Chace
*Assistant Examiner* — Leandro Villanueva
(74) *Attorney, Agent, or Firm* — Anderson Gorecki & Rouille LLP

(57) ABSTRACT

To facilitate both minimal allocations and adaptive allocations, two sets of storage group policies are defined—one policy setting minimal allocation values for storage group access to storage resources and one policy setting maximal allocation values for storage group access to storage. In addition, a set of priority weights is specified that is used to balance access to storage tiers across storage groups. Upon existence of contention for storage resources, minimum allocation values for storage groups are determined based on the priority weights for the storage groups, resulting in threshold values being set to enable at least partial access to storage resources for all storage groups without requiring priority weighting of the activity density distributions of the competing storage groups. Allocations other than the minimal allocations are provided based on relative activity density distribution of storage extents between groups.

16 Claims, 7 Drawing Sheets

Capacity/score histogram for EFD Activity Threshold calculation.

Capacity/score histogram for FC Activity Threshold calculation.

Capacity/score histogram for SATA Inactivity Threshold calculation.

Capacity/score histogram for FC Inactivity Threshold calculation.

METHOD AND APPARATUS FOR ENABLING ACCESS TO TIERED SHARED STORAGE USING DYNAMIC TIER PARTITIONING

CROSS REFERENCE TO RELATED APPLICATIONS

None

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to enabling access to tiered shared storage and, more particularly, to a method and apparatus for enabling access to tiered shared storage using dynamic tier partitioning.

DESCRIPTION OF THE RELATED ART

A computer includes one or more central processing units and other hardware that together execute operations to allow the computer to process data. Storage arrays have been developed to store data for one or more computer systems. Storage arrays generally include multiple physical disks drives, and a storage system allocates storage capacity offered by the disk drives to enable external computer systems to store data and obtain access to data stored in the storage array.

In general, smaller faster disk drives are more expensive, while larger slower disk drives are less expensive. To take advantage of the cost savings associated with the slower disk drives, while still providing fast access to data, a tiered storage array may be created using storage devices of multiple types. Specifically, a tiered storage system is a storage system that supports storage tiers for which the capital or operational costs per unit of input/output operation processing, or per unit of storage capacity, are different. Differences may be due to the use of different underlying drive technologies, such as Enterprise Flash Drives (EFD) or other solid-state drives, Fiber Channel (FC) drives, and Serial Advanced Technology Attachment (SATA) drives. Alternatively, the differences between storage tiers may be due to different strategies for leveraging storage capacity, such as through compression, or the use of different power management strategies. Many ways of differentiating storage capabilities may be used to identify and define tiers of storage in a tiered storage system.

In a tiered storage system, if the distribution of input/output (I/O) accesses on the tiers exhibits temporal and spatial non-uniformities that can be identified, moving data between tiers can improve the overall performance of the storage array. For example, if there are a large number of I/O accesses to data in a particular storage volume, moving the storage volume to a higher performance storage tier may accelerate the overall performance of the storage array. Moving data from a lower tier to a higher tier will be referred to herein as "promotion" and moving data from a higher tier to a lower tier will be referred to herein as "demotion". Activity thresholds are used to identify data that should be promoted and demoted. Over time, activity levels will cause data to be spread out over the tiers of the storage array so that the more heavily accessed data is stored in higher performing tiers and the less heavily accessed data is stored in lower performing tiers.

There are instances, unfortunately, where contention occurs between devices for resources in the higher performance storage tiers. Conventionally, policies and preferences have been used to specify allocations to devices in the storage tiers and to reduce contention and resolve allocation between devices when contention occurs. Unfortunately, there are instances where a device may be prevented from obtaining any capacity in the higher performing tiers despite a policy that explicitly provides for the device to obtain at least some capacity in the higher performing tier. For example, if data in a lower tier has a policy specifying an ability to store data in a higher tier, and the activity levels for the data currently stored in the higher tier are at or above a demotion threshold, the data in the lower tier will not be able to evict data from the higher tier despite a policy which provides for access to the higher tier. Thus, in this and other instances, it is possible that one or more devices will be starved of access to the higher performing tier when contention occurs. Accordingly, it would be advantageous to provide a mechanism by which at least a minimum amount of capacity may be guaranteed to devices in a tiered storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

To facilitate both minimal allocations and adaptive allocations, two sets of storage group policies are defined—one policy setting minimal allocation values for storage group access to storage resources and one policy setting maximal allocation values for storage group access to storage. In addition, a set of priority weights is specified that is used to balance access to storage tiers across storage groups. Upon existence of contention for storage resources, minimum allocation values for storage groups are determined based on the priority weights for the storage groups, resulting in threshold values being set to enable at least partial access to storage resources for all storage groups without requiring priority weighting of the activity density distributions of the competing storage groups. Allocations other than the minimal allocations are provided based on relative activity density distribution of storage extents between groups.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
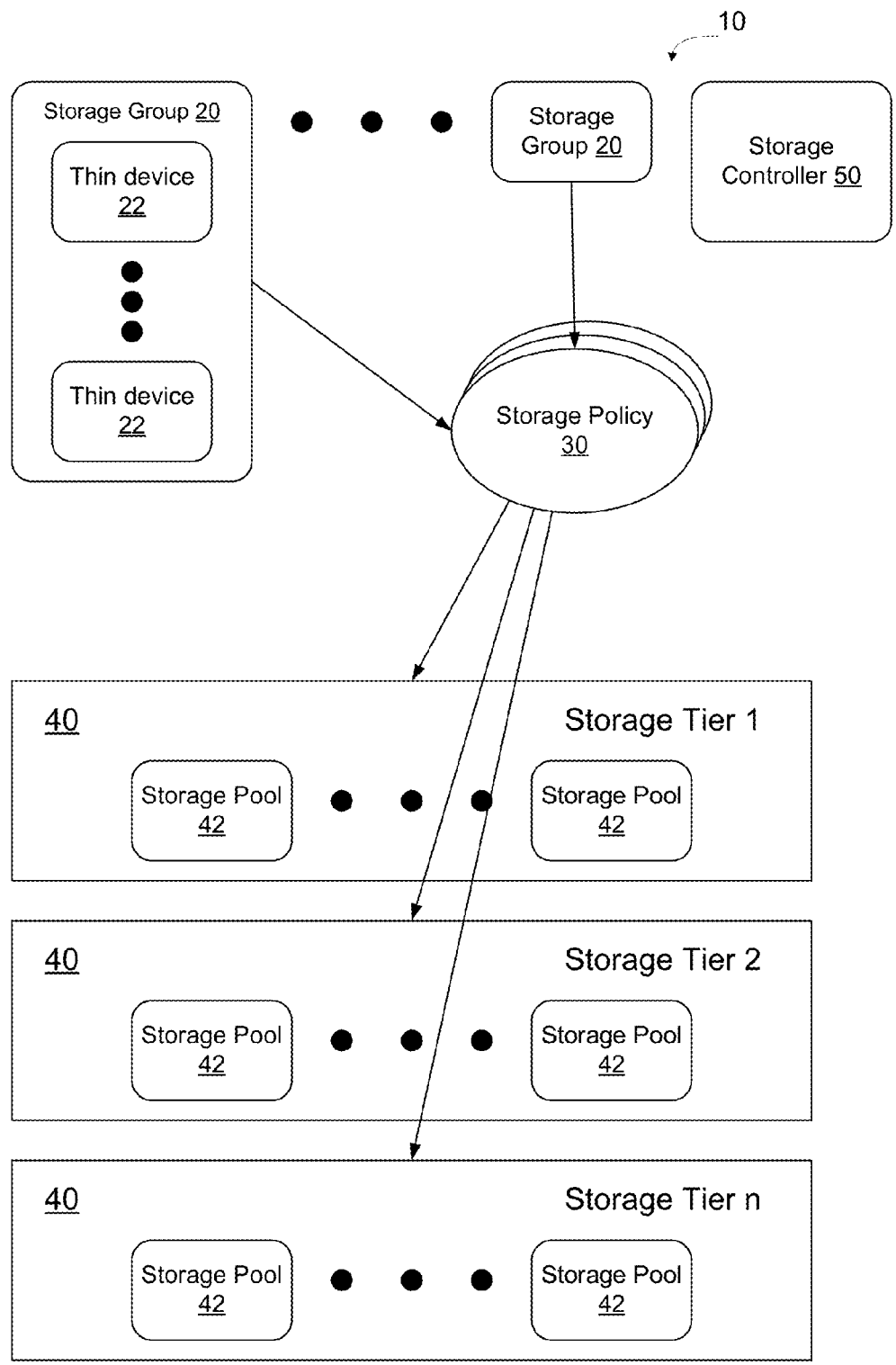
FIG. 1 is a functional block diagram of a tiered storage system.

FIG. 1 shows a functional block diagram of a tiered network storage system 10. As shown in FIG. 1, the storage system 10 supports storage tiers for which the capital or operational costs per unit of I/O operation processing or per unit of storage capacity are different. Differences might be due to the use of different underlying drive technologies (such as EFD vs. FC vs. SATA), or different strategies for leveraging storage capacity (such as compression) or different power management strategies. This type of storage system is particularly useful where the distribution of I/O accesses in storage workloads exhibits temporal and spatial non-uniformities that are identifiable, so that the more active storage workloads are able to be moved to faster storage tiers and vice-versa. If both of these conditions are met, then in principle a lower cost storage configuration can satisfy a given set of performance goals if storage mappings are adjusted on-the-fly between the available storage tiers so as to maximally exploit the capabilities of each tier.

The needed 'on-the-fly' adjustments to storage mappings could be made manually, but in practice the administrative overhead required to manage this approach, even if the storage mapping changes are made at a coarse level of spatial granularity, such as the level of entire Logical Unit Numbers (LUNs), is far too great. Accordingly, automated systems for moving data between storage tiers have been developed which will automatically plan and non-disruptively execute the needed changes to the storage mappings.

In one embodiment, the storage system is able to perform these 'on-the-fly' adjustments continuously and without bogging the system down with data movement overhead. The ability to monitor and move data at a fine level of spatial granularity, e.g. 768 KB, allows the storage system to narrowly target the data movements used to shift load from one storage tier to another, with a minimum amount of data movement.

In the example storage system shown in FIG. 1, there are three structural elements: storage groups 20, storage policies 30, and storage tiers 40. Storage groups define groups of thin devices 22 used to present managed storage to hosts. The storage tiers 40 define physical storage to be used by the thin devices. The storage policies 30 define which storage groups can use physical storage from which storage tiers, and how much capacity of each of the available tiers may be used by the set of thin devices within the storage groups.

Thin devices 22 appear as virtual storage to applications and end systems (hosts), and can be used in many of the same ways that regular host accessible storage devices have traditionally been used. Unlike regular storage devices, however, thin devices are only allocated physical memory from a shared pool of memory when needed and do not need to have physical storage completely allocated at the time the devices are created and presented to a host. Thin devices may be compared with fat devices, which have provisioned storage volumes regardless of whether or not the host has provided data that is required to be stored in the storage array. The physical storage that is used to supply drive space for a thin device comes from a shared thin storage pool 42 that has been associated with the thin device.

A thin storage pool is formed from one or more devices, called a data devices, that are dedicated to the purpose of providing the actual physical storage used by thin devices. When a write is performed to a portion of the thin device, the storage system allocates a minimum allotment of physical storage from the storage pool and maps that physical storage to a region of the thin device including the area targeted by the write. The storage allocation operations are performed in small units of storage called "thin device extents." As space is to be allocated, a round-robin mechanism is used to balance the allocation of data device extents across all of the data devices in the storage pool that are enabled and that have remaining unused capacity. In one embodiment, the thin device extent size is twelve 64 KB tracks (768 KB), although other extent sizes may be used as well. When a read is performed on a thin device, the data being read is retrieved from the appropriate data device in the storage pool to which the thin device is bound.

To be managed by the storage system 10, a thin device must belong to a storage group 20 that is associated with a storage policy 30. A storage group 20 may be associated with at most one storage policy at a time. Optionally a storage group may contain both thick and thin devices, but only the thin devices in a storage group will be dynamically managed.

A storage group may be considered an algorithmic boundary in the storage system. In one embodiment, thin devices within a given storage group 20 are considered to have equal importance and the storage system will not differentiate or prioritize between thin devices of the same storage group. However, it is possible to pin a thin device so that the storage system compliance and intelligent tiering algorithms will not perform any data movements on extents belonging to the thin device.

A storage tier 40 defines physical storage that can be used by thin devices. Each storage tier includes a number of storage pools 42, for example between 1 and 4 storage pools. Depending on the embodiment, a given storage tier may require each of the storage pools to be implemented using the same drive technology (EFD, FC or SATA) and protection (RAID5 3+1, RAID5 7+1, RAID6 6+2, RAID6 14+2). In other embodiments this restriction may be relaxed.

If a storage tier 40 contains more than one storage pool 42, when data is moved into the storage tier, the particular storage pool chosen to be used to store the data is selected in a round-robin fashion (excluding storage pools that have reached or exceeded a storage pool reserved capacity limit). Other mechanisms for allocating data between storage pools in a tier may be used as well.

A storage policy 30 specifies which storage tiers 40 an associated set of storage groups 20 is permitted to use. Storage allocation operations performed on behalf of the thin devices 22 associated with a storage policy 30 are satisfied using the bind pool of the thin device, which is required to be a storage pool 42 belonging to one of the storage tiers 40 associated with the storage policy 30.

Since the storage policies dictate what resources are available to thin devices, it is possible for multiple storage policies 30 to use a given storage tier 40. However, since the storage pools are implemented using a given technology, a given storage pool can belong to at most one storage tier. Note, also, that to associate a storage group with a storage policy, the storage group must not contain any thin devices which have a bind pool that is not one of the storage pools associated with one of the storage tiers associated with the storage policy.

The storage system may dynamically remap a range of address ranges for a managed thin device to any of the storage pools belonging to the storage tiers associated with the storage policy. This means that each thin device from each storage group associated with a storage policy may, at any time, have extents of storage mapped to any or all of the storage pools associated with the storage policy.

The storage policy may also specify limits on the amount of storage capacity that each storage group associated with the storage policy can have allocated from a given storage tier. In one embodiment, the limits are specified as a percentage of total capacity allocated to the storage group. For example, the storage policy may specify a maximum percentage of the logical capacity of a storage group that each storage group is permitted to have mapped to each storage tier at a given time. The 'logical capacity' of a storage group refers to the sum of the presented (logical) sizes of all of the managed thin devices 22 in the storage group 20.

To optimize throughput from the storage system, it is preferable to have extents with a high level of activity stored in higher performing storage tiers, and to have extents with a lower level of activity stored in lower performing storage tiers. Since the activity level of a given extent may change over time, the allocation of extents to storage levels is updated and data is moved between storage tiers to optimize performance of the storage system.

As noted, it is possible for any given tier to be used by multiple storage policies, and each storage policy can be associated with multiple storage groups. When multiple storage groups make use of the same storage tier (whether by the same storage policy or not), these multiple storage groups 20 will compete with each other for space in the tier 40. When there is insufficient storage to satisfy each of the storage groups, one or more of the storage groups will be allocated storage in the tier in preference to one or more of the other storage groups. Although it is possible to select between storage groups by assigning relative priority rankings to the storage groups, use of storage rankings in this manner has been found to result in resource starvation in which particular storage groups are denied total access to higher performing storage tiers. In particular, it has been found to be difficult to control priority weights such that starvation from higher performing tiers is avoided in all circumstances.

According to an embodiment, dynamic tier partitioning is used to guarantee minimal allocations to each storage group, by dynamically allocating until each storage group demand is met and by eliminating the need to priority weight histograms. To understand how dynamic tier partitioning works, a brief explanation of tier allocation will first be provided, followed by an explanation of the dynamic tier partitioning process.

Tier Allocation

In one embodiment, the process begins with allocating capacity in the highest performing storage tier. For example Enterprise Flash Drives (EFD) may be used to implement a high performance storage tier 40 of the storage system. To begin an activity threshold calculation for the highest performing storage tier, the process first identifies all storage policies 30 that use the highest performing storage tier and identifies storage groups 20 that use those storage policies.

Histograms are used to chart the activity levels of extents within a storage tier, and are used to determine which extents should be promoted to a higher performing tier or demoted to a lower performing storage tier. These histograms are used to verify that a candidate activity threshold for a given storage group is consistent with the allocation limit for the storage group, as specified by the storage policy associated with the storage group.

In one embodiment, a histogram is created for a given storage group by setting an X-axis of the histogram in units of prioritized short-term score and the Y-axis is the amount of allocated active storage (since only the active allocated portions (sub-extents) of a storage extent are recommended for placement in the highest performing storage tier when the activity threshold is met).

For each storage extent in the storage group, the prioritized short term access is calculated and the amount of allocated storage corresponding to the active sub-extents of the storage extent is determined and added to the histogram bucket corresponding to the prioritized short term score. Note that the storage extent level metrics used to calculate the score and the amount of allocated storage are obtained from a local data store maintained by the storage controller 50. Once all of the storage extents of a given storage group have been processed into the histogram, the histogram can be used to estimate the amount of highest performing storage tier storage that a given activity threshold would cause to be consumed. Note that storage that is considered not movable is not added to the histogram. Storage is considered not movable if it is not under the control of the storage system, if it is pinned, or if allocation metrics are not yet available (if any extent belonging to a thin device does not have allocation metrics set yet, then the whole device is treated as unmovable).

Figure 2:
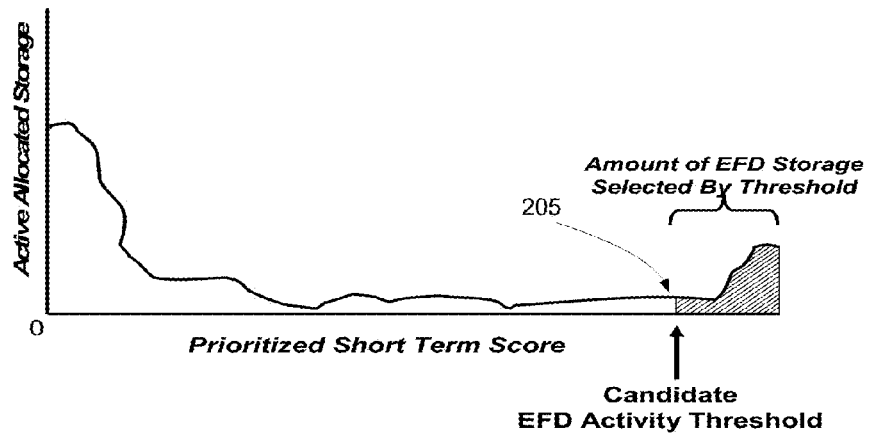
FIG. 2 is capacity/score histogram for highest tier storage promotion activity threshold calculation.

FIG. 2 shows an example histogram that may be created by looking at the activity levels of the storage extents that are currently using a given storage tier. As shown in FIG. 2, the X axis is the prioritized short term score (i.e. activity level of a given extent), with the Y axis indicating the amount of data involved in the storage read/write operations.

Figure 3:
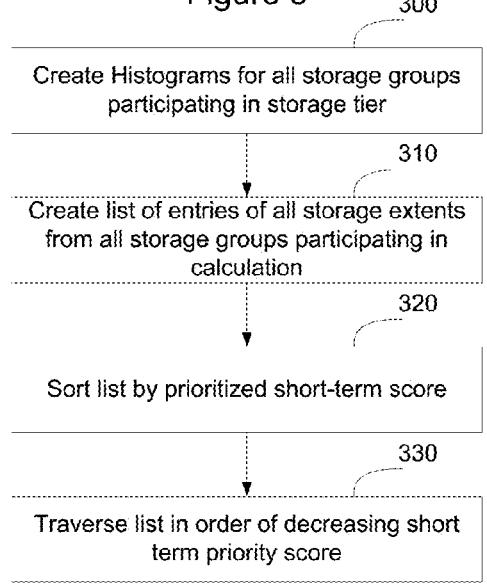
FIGS. 3 and 4 are flow charts of an example process showing one method of calculating an activity threshold for the highest performing storage tier.

As shown in FIG. 3, once histograms have been created for all storage groups participating in the calculation (300), a single list (not a list per storage group) is created containing an entry for each of the storage extents from all storage groups participating in the calculation (310). Each entry in the list contains an extent ID (storage group #, Device # and Extent #) and the prioritized short-term score of the storage extent. This list is then sorted by prioritized short-term score (320). A variable holding the candidate highest performing storage tier activity threshold is allocated for each storage group and initially set equal to a huge (unattainable) value. Starting with the entry with highest short term score, the list is traversed in order of decreasing short term prioritized score and the candidate highest performing storage tier Threshold 205 is updated (330) using the process shown in FIG. 4.

Figure 4:
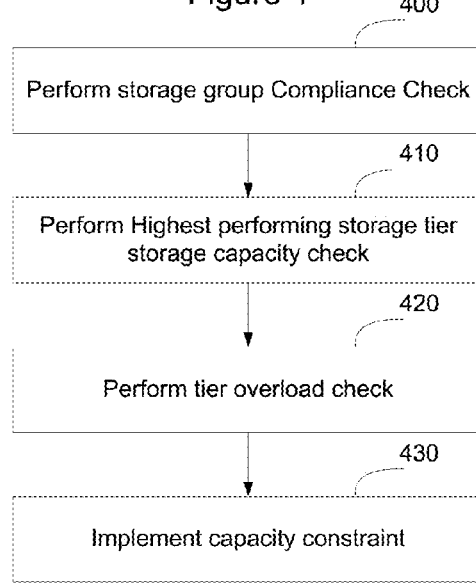

Specifically, as shown in FIG. 4, a storage group compliance check is performed (400). To perform a storage group compliance check, the histogram corresponding to the storage group that owns the entry is checked: if the amount of active allocated storage selected by the threshold does not violate the highest performing storage tier allocation limit for the storage group, then the corresponding local variable containing the candidate highest performing storage tier activity threshold for the storage group is updated to the short term score from the current list entry. If the highest performing storage tier allocation limit is violated, then the candidate highest performing storage tier activity threshold for the storage group is left as is, and is no longer updated during the traversal of the extent list (but subject to adjustments described below).

Then, a highest performing storage tier storage capacity check is performed (410). When the total amount of active allocated storage selected by the highest performing storage tier activity thresholds of all storage groups reaches the amount of storage capacity in the highest performing storage tier available (taking into account the pool reserved capacity settings of the thin storage pools comprising the tier, tier storage that is not controlled by the storage system, pinned data and storage for which allocation metrics are not available), then traversal of the extent list ceases, and the candidate highest performing storage tier activity thresholds of all storage groups are subject to the adjustments described below.

Finally, a tier overload check is performed (420). When the total load on the drives underlying the highest storage tier exceed a specified utilization and/or response time limit, then traversal of the extent list ceases, and the candidate highest performing storage tier activity thresholds (205) of all storage groups are subject to the adjustments described below. This check enables a performance limit (input/output operation limit) to be imposed, since the available capacity in the drive may be limited not only by the physical storage capacity but also by the number of read/write operations in any given period of time.

Optionally, a capacity constraint may also be implemented (430) to further constrain the amount of highest performing storage tier storage that the promotion thresholds are allowed to encompass. This option is expressed as a percentage of high tier storage capacity. If the amount of encompassed storage reaches this limit, then traversal of the extent list ceases, and the candidate highest performing storage tier activity thresholds of all storage groups are subject to the adjustments described below.

Once traversal of the extent list has completed, the priority factor is divided out (so that the array does not need to prioritize the score that it calculates). According to an embodiment, the resulting highest performing storage tier activity threshold (205) for each storage group is constrained to be at least a certain amount, to ensure that each storage group which is entitled to have access to the highest performing storage tier will obtain at least some portion of the capacity of the highest performing storage tier. This constraint is described in greater detail below in connection with dynamic tier partitioning.

Once the activity thresholds for the highest performing storage tier are calculated, activity thresholds for the next highest performing (second) storage tier will be calculated. The second storage tier may be implemented, for example, via Fiber Channel. The procedure for determining the second tier activity threshold for each storage group is very similar to the procedure used to determine the highest performing storage tier activity threshold (and must be done after the highest performing storage tier activity threshold has been calculated). To begin the second tier activity threshold calculation for a given second tier, all storage policies that use the tier are identified, and all storage groups that use those storage policies are identified.

Figure 5:
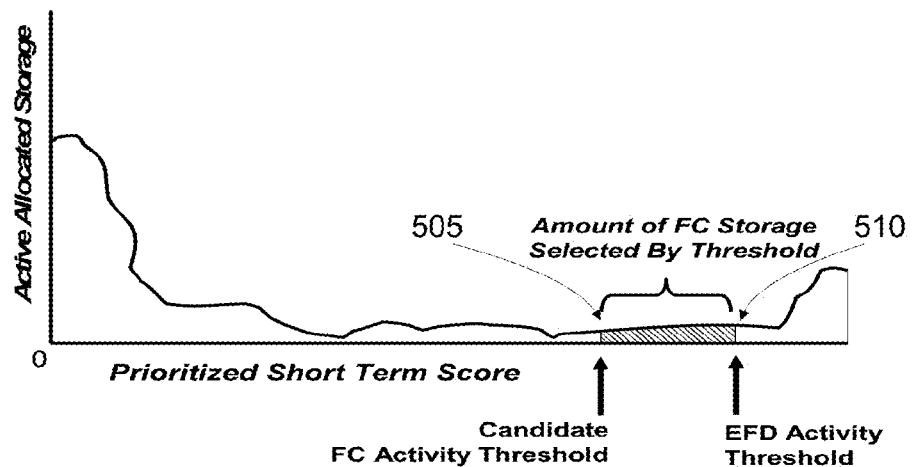
FIG. 5 is capacity/score histogram for a middle tier storage promotion activity threshold calculation.

Next, for each storage group participating in the calculation a capacity/score histogram is created. This is the same histogram that would be built to determine the highest performing storage tier activity threshold, and it is used to verify that a candidate second tier activity threshold for a given storage group is consistent with the second tier allocation limit for the storage group per the storage policy associated with the storage group. FIG. 5 shows an example capacity/score histogram for a second storage tier. However, the procedure for making this determination is slightly different. To determine the amount of storage capacity that a candidate second storage tier activity threshold selects for placement in the second storage tier, the system measures the amount of capacity in the histogram buckets with prioritized short term scores that are greater than or equal to the candidate second storage tier activity threshold 505 but less than the highest performing storage tier activity threshold 510.

Once histograms have been created for all storage groups participating in the calculation, a single list (not a list per storage group) is created containing an entry for each of the storage extents from all storage groups participating in the calculation. Each entry in the list contains an extent ID (storage group #, Device # and Extent #) and the prioritized short-term score of the storage extent. This list is then sorted according to prioritized short-term score. A variable holding the candidate second storage tier activity threshold is allocated for each storage group and initially set equal to a huge (unattainable) value. Starting with the entry with the highest short term score, the list is traversed in order of decreasing short term prioritized score and the candidate activity thresholds are updated along the way as follows:

First, a storage group compliance check is performed. To perform a storage group compliance check, the histogram corresponding to the storage group that owns the entry is checked: if the amount of active allocated storage selected by the threshold does not violate the second storage tier allocation limit for the storage group, then the corresponding local variable containing the candidate second storage tier activity threshold for the storage group is updated to the short term score from the current list entry. If the second storage tier allocation limit is violated, then the candidate second storage tier activity threshold for the storage group is left as is, and is no longer updated during the traversal of the extent list (but subject to adjustments described below).

Then, a second storage tier storage capacity check is performed. When the total amount of active allocated storage selected by the second storage tier activity thresholds of all storage groups reaches the amount of storage capacity in second storage tier available for management by the storage system (taking into account the pool reserved capacity settings of the thin storage pools comprising the tier, tier storage that is not controlled by storage system, pinned data and storage for which allocation metrics are not available), then traversal of the extent list ceases, and the candidate second storage tier activity thresholds of all storage groups are subject to the adjustments described below.

Finally, a tier overload check is performed. When the total load on the drives underlying the second storage tier exceed a specified utilization and/or response time limit, then traversal of the extent list ceases, and the candidate second storage tier activity thresholds of all storage groups are subject to the adjustments described below.

Optionally, a capacity constraint may also be implemented to further constrain the amount of second storage tier storage that the promotion thresholds are allowed to encompass. This option is expressed as a percentage of second storage tier storage capacity. If the amount of encompassed storage reaches this limit, then traversal of the extent list ceases, and the candidate second storage tier activity thresholds of all storage groups are subject to the adjustments described below.

Once traversal of the extent list has completed, the priority factor is divided out (so that the array does not need to prioritize the score that it calculates). According to an embodiment, as described in greater detail below in connection with dynamic tier partitioning, the resulting second storage tier activity threshold for each storage group is constrained to be at least a certain amount. By constraining the result so that each storage group obtains at least a certain amount, each storage group is guaranteed access to at least a minimum level of access to the resources associated with the storage tier.

If there are other intermediate storage tiers, a process similar to the process described above in connection with FIG. 5 may be implemented to determine activity thresholds for each of the intermediate storage tiers. In processing these intermediate storage tiers, the process progresses by calculating activity thresholds for higher performing storage tiers first, and successively determining activity thresholds for successively lower performing storage tiers. Although an example is described herein in which there are three storage tiers, other embodiments may have other numbers of storage tiers. Processing of the other intermediate storage tiers proceeds as described above in connection with the second storage tier.

The lowest performing storage tier is used to hold data that is below an inactivity threshold 605. Before calculating the lowest storage tier inactivity threshold for a storage group, the activity thresholds for each of the higher performing storage tiers must already have been determined. The calculation begins with the identification of all storage policies that use the lowest performing storage Tier and all storage groups that use those storage policies.

Next, for each storage group participating in the calculation, a capacity/score histogram is created. This histogram is used to verify that a candidate lowest performing storage tier inactivity threshold for a given storage group is consistent with the lowest performing storage tier allocation limit for the storage group per the storage policy associated with the storage group.

The histogram is created for a given storage group as follows. The X-axis of the histogram is in units of prioritized long-term score and the Y-axis is the amount of allocated storage (excluding storage capacity of active sub-extents that are recommended to be in a higher tier).

Figure 6:
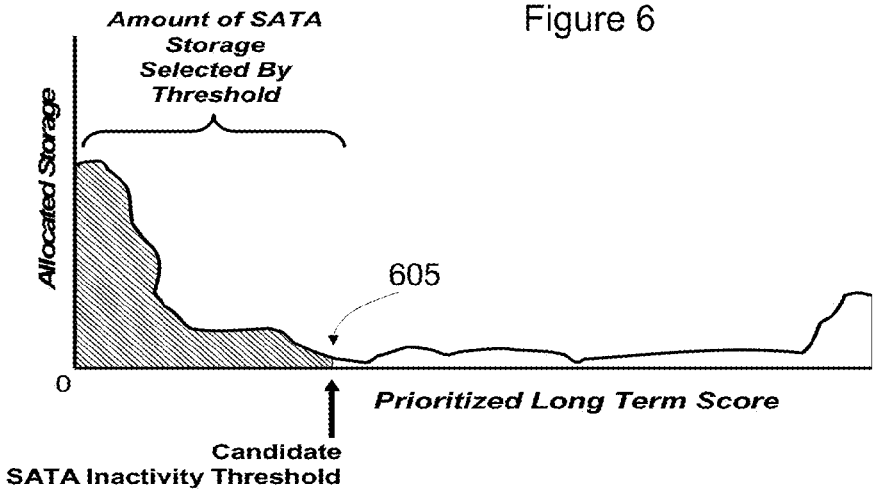
FIG. 6 is capacity/score histogram for lowest tier storage inactivity demotion threshold calculation.

To build the histogram for a given storage group, the following is done for each storage extent in the storage group: first, the prioritized short and long term access scores are calculated. Then the amount of allocated storage corresponding to the inactive sub-extents of the storage extent is determined, and added to the histogram bucket corresponding to the long-term score. If the short term score does not equal or exceed the highest performing storage or second storage tier activity thresholds for the storage group, then the amount of storage capacity corresponding to the active sub-extents is also added to the histogram bucket corresponding to the long term score. Once all of the storage extents of a given storage group have been processed into the histogram, the histogram can be used to estimate the amount of lowest performing storage tier storage that a given lowest performing storage tier inactivity threshold would cause to qualify for placement in the lowest performing storage tier. FIG. 6 shows an example histogram created using this process.

Once histograms have been created for all storage groups participating in the calculation, a single list (not a list per storage group) is created containing an entry for each of the storage extents from all storage groups participating in the calculation. Each entry in the list contains an extent ID (storage group #, Device # and Extent #) and the prioritized long-term score of the storage extent. This list is then sorted by prioritized long-term score. A variable holding the candidate lowest performing storage tier inactivity threshold is allocated for each storage group and initially set equal to zero. Starting with the entry with the lowest long term score, the list is traversed in increasing order of long term prioritized score and the candidate lowest performing storage tier inactivity thresholds are updated along the way as follows:

First, a storage group compliance check is implemented. To implement a storage group compliance check, the histogram corresponding to the storage group that owns the entry is checked: if the amount of allocated storage selected by the threshold does not violate the lowest performing storage tier allocation limit for the storage group, then the corresponding local variable containing the candidate lowest performing storage tier inactivity threshold for the storage group is updated to the prioritized long term score from the current list entry. If the lowest performing storage tier allocation limit is violated, then the candidate lowest performing storage tier inactivity threshold for the storage group is left as is, and is no longer updated during the traversal of the extent list (but subject to adjustments described below).

Then a lowest performing storage tier storage capacity check is implemented. When the total amount of active allocated storage selected by the lowest performing storage tier inactivity thresholds of all storage groups reaches the amount of storage capacity in the lowest performing storage tier available for the storage system (taking into account the pool reserved capacity settings of the thin storage pools comprising the tier, tier storage that is not controlled by the storage system, pinned data and storage for which allocation metrics are not available), then traversal of the extent list ceases, and the candidate lowest performing storage tier inactivity thresholds of all storage groups are subject to the adjustments described below.

It may be possible to optionally also implement a tier overload check. When the total load on the disk arrays or drives underlying the lowest performing storage tier exceed a specified utilization and/or response time limit, then traversal of the extent list ceases, and the candidate lowest performing storage tier inactivity thresholds of all storage groups are subject to the adjustments described below. This overload check helps to ensure at least a minimum performance level by the lowest performing storage tier to ensure that the lowest performing storage tier is not overloaded and unable to meet target performance goals.

In addition to setting the inactivity thresholds, if the 'optional capacity constraint' was used to place a limit on how low the promotion thresholds were allowed to get, then a further constraint is placed on how high the demotion thresholds are allowed to get. This maximum demotion score value is calculated from the demotion histogram by determining the point in the histogram where the area under the histogram to the right of the point equals the amount of second tier storage and highest performing storage tier storage that was suppressed from inclusion in the promotion thresholds. If the amount of allocated storage selected by the lowest performing storage tier inactivity threshold reaches this value, then traversal of the extent list ceases, and the candidate lowest performing storage tier inactivity thresholds of all storage groups are subject to the adjustments described below.

Once traversal of the extent list has completed, the priority factor is divided out (so that the array does not need to prioritize the score that it calculates).

After calculation of the inactivity threshold for the lowest priority storage tier, inactivity thresholds (demotion thresholds) are calculated for each of the remaining higher level storage tiers. In this process, the lower performing storage tiers are evaluated first to identify extents that should be moved to lower performing storage tiers. The process sequentially evaluates each of the storage tiers in order of increasing performance until each of the storage tiers has been evaluated. In an embodiment in which there are three performance tiers, after calculating inactivity thresholds for the lowest performing storage tier, the process determines inactivity thresholds for the second tier storage and finally for the highest performing storage tier. Where there are additional intervening storage tiers, each successive intervening storage tier would be processed in a manner similar to how the second tier storage tier is processed, as set forth below.

Before calculating the second storage tier inactivity threshold (demotion threshold) for a storage group, the highest performing storage tier activity threshold (promotion threshold), second storage tier activity threshold (promotion threshold) and lowest performing storage tier inactivity threshold must already have been determined. Once this has been completed, the calculation of the second storage tier inactivity threshold (demotion threshold) begins with the identification of all storage policies that use the second storage tier and all storage groups that use those storage policies.

Next, for each storage group participating in the calculation, a capacity/score histogram is created. This histogram is used to verify that a candidate second storage tier inactivity threshold for a given storage group is consistent with the second storage tier allocation limit for the storage group per the storage policy associated with the storage group.

The histogram is created for a given storage group as follows. The X-axis of the histogram is in units of prioritized long-term score and the Y-axis is the amount of allocated storage (excluding storage capacity of active sub-extents that are recommended to be in a higher tier). To build the histogram for a given storage group, the following is done for each storage Extent in the storage group: first, the prioritized short and long term access scores are calculated. Then the amount of allocated storage corresponding to the inactive sub-extents of the storage Extent is determined, and added to the histogram bucket corresponding to the long-term score. If the short term score does not equal or exceed the highest performing storage tier activity threshold for the storage group, then the amount of storage capacity corresponding to the active sub-extents is also added to the histogram bucket corresponding to the long term score. Once all of the storage extents of a given storage group have been processed into the histogram, the histogram can be used to estimate the amount of second storage tier storage that a given second storage tier inactivity threshold would cause to qualify for placement in the second storage tier.

Figure 7:
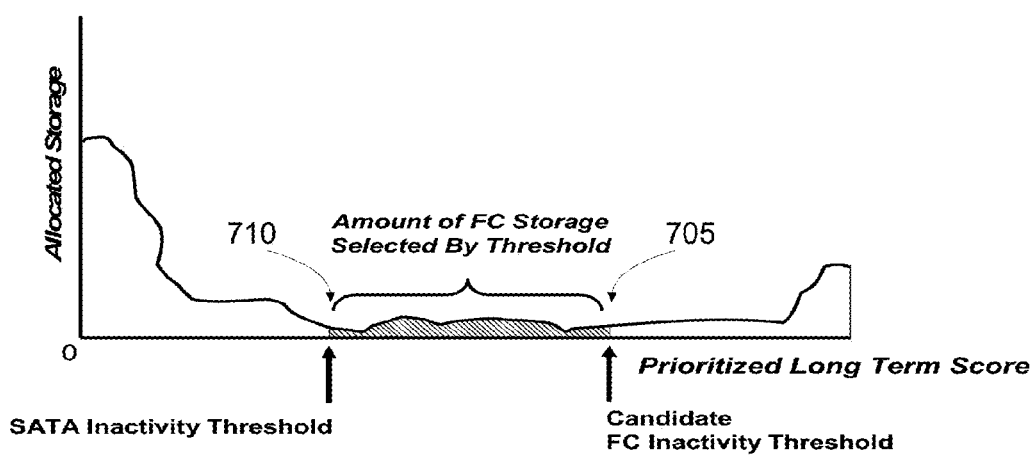
FIG. 7 is capacity/score histogram for middle and highest tier storage demotion inactivity threshold calculation.

As shown in FIG. 7, to determine the amount of storage capacity that a candidate second storage tier inactivity threshold selects for placement in the second storage tier, the process measures the amount of capacity in the histogram for buckets with prioritized long term scores that are less than the candidate second storage tier inactivity threshold (705) but greater than or equal to the lowest performing storage tier inactivity threshold (710).

Once histograms have been created for all storage groups participating in the calculation, a single list (not a list per storage group) is created containing an entry for each of the storage Extents from all storage groups participating in the calculation. Each entry in the list contains an extent ID (storage group #, Device # and Extent #) and the prioritized long-term score of the storage Extent. This list is then sorted by prioritized long-term score. A variable holding the candidate second storage tier inactivity threshold is allocated for each storage group and initially set equal to zero. Starting with the entry with the lowest long term score, the list is traversed in increasing order of long term prioritized score and the candidate second storage tier inactivity thresholds are updated along the way as follows:

Initially, a storage group compliance check is implemented. To do this, the histogram corresponding to the storage group that owns the entry is checked: if the amount of allocated storage selected by the threshold does not violate the middle tier allocation limit for the storage group, then the corresponding local variable containing the candidate lowest tier inactivity threshold for the storage group is updated to the prioritized long term score from the current list entry. If the middle tier allocation limit is violated, then the candidate lowest tier inactivity threshold for the storage group is left as is, and is no longer updated during the traversal of the extent list (but subject to adjustments described below).

Then, a second storage tier storage capacity check is implemented. When the total amount of active allocated storage selected by the second storage tier inactivity thresholds of all storage groups reaches the amount of storage capacity in middle tier available for storage system (taking into account the pool reserved capacity settings of the thin storage pools comprising the tier, tier storage that is not controlled by storage system, pinned data and storage for which allocation metrics are not available), then traversal of the extent list ceases, and the candidate second storage tier inactivity thresholds of all storage groups are subject to the adjustments described below.

Finally, an optional capacity constraint may be used to adjust the inactivity thresholds. If the 'optional capacity constraint' was used to place a limit on how low the promotion thresholds were allowed to get, then a further constraint is placed on how high the demotion thresholds are allowed to get. This maximum demotion score value is calculated from the demotion histogram by determining the point in the histogram where the area under the histogram to the right of the point equals the amount of highest performing storage tier storage that was suppressed from inclusion in the promotion thresholds. If the amount of allocated storage selected by the second storage tier inactivity threshold reaches this value, then traversal of the extent list ceases, and the candidate second storage tier inactivity thresholds of all storage groups are subject to the adjustments described below.

Once traversal of the extent list has completed, the priority factor is divided out (so that the array does not need to prioritize the score that it calculates).

Dynamic Tier Partitioning

Although this process is useful in allocating capacity of a multi-tier storage system between storage groups, there are instances where this process still allows starvation to occur. According to an embodiment, in addition to allocating storage using this process, an additional process is used to provide minimal allocations as well as the above-described adaptive allocations. In particular, by allocating storage capacity in this manner, it is possible to fairly allocate capacity to storage groups across storage tiers by guaranteeing minimal allocations to each storage group, and dynamically allocating until each storage group demand is met. This has the added benefit of eliminating the need to priority weight histograms.

To facilitate both minimal allocations and adaptive allocations, two sets of storage group policies are defined:

$$P^m = \begin{bmatrix} P_{10}^m & P_{11}^m & P_{12}^m \\ \vdots & \vdots & \vdots \\ P_{N0}^m & P_{N1}^m & P_{N2}^m \end{bmatrix} = [P_0^m \quad P_1^m \quad P_2^m]$$

$$P^M = \begin{bmatrix} P_{10}^M & P_{11}^M & P_{12}^M \\ \vdots & \vdots & \vdots \\ P_{N0}^M & P_{N1}^M & P_{N2}^M \end{bmatrix} = [P_0^M \quad P_1^M \quad P_2^M]$$

In these policies, the first subscript number identifies the storage group and the second subscript number identifies the storage tier. For example, $P_{10}$ would refer to the policy allocation to be provided to storage group 1 in storage tier 0. Likewise, $P_{32}$ would refer to the policy allocation or amount of storage in storage tier 2 to be provided to storage group 3. As shown above, according to an embodiment, the policies used include two values—a first policy specifying minimal guaranteed allocations to storage groups (designated with a lower case superscript m—e.g. $P^m$) as well as policies specifying maximum allocations to be allotted to storage groups (designated with an upper case superscript M—e.g. $P^M$).

In addition to using policies to specify both minimum and maximum allocations, in one embodiment the process also uses $P^m$ to distribute the tier minimally across the storage groups utilizing the set of priority weights:

$$W = \begin{bmatrix} W_{01} & W_{11} & W_{21} \\ \vdots & \vdots & \vdots \\ W_{0N} & W_{1N} & W_{2N} \end{bmatrix} = [W_0 \quad W_1 \quad W_2]$$

The meaning and use of these priority weights is very different from how priority weights have been used previously. Specifically, previously priority weights were used to adjust activity density distributions to try to balance access to storage tiers across storage groups. In this process, by contrast, the priority weights are used to adjust storage demands whenever the total minimal demand is greater than the tier capacity. The priority weights are not used to modify the activity density distributions. For example, if $S^T P^m_0 > T_0$ (S indicating the Storage demand) such that total minimal tier 0 demand is greater than tier 0 capacity, the minimal allocation vector is defined as $$A_0^m = \frac{T_0}{S^T W_0} W_0.$$

In this case, the tier 0 promotion thresholds are determined by $A_0^m$, not by $P_0^m$, so that the total storage volume does not exceed the tier 0 capacity. The algorithm then continues on to the adaptive phase where each storage group gets further tier allocation depending on how its activity density distribution compares with the others, as described above.

Figure 8:
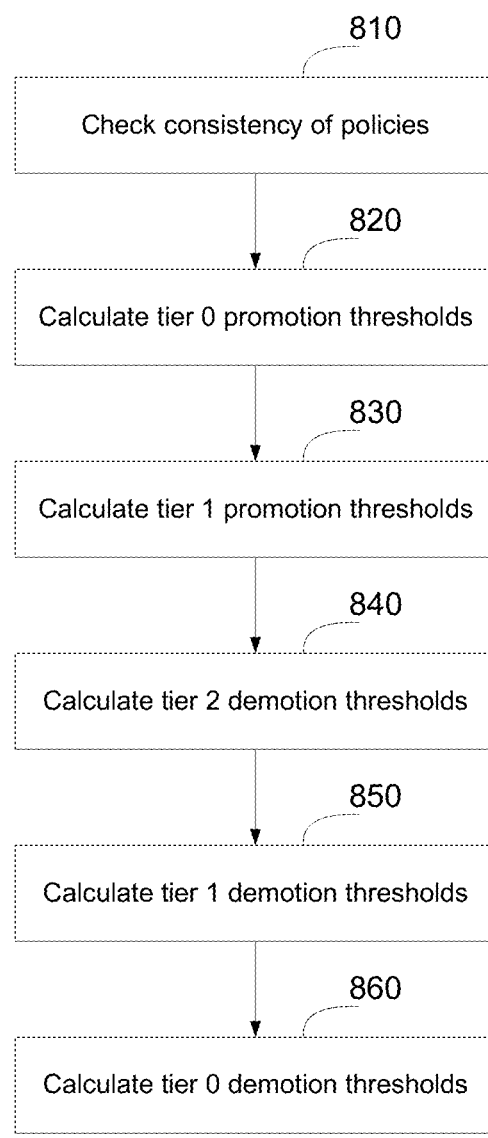
FIG. 8 is a flow chart of an example process showing an overall process of determining promotion and demotion thresholds for storage tiers.

Assuming that there are three tiers (tier 0, tier 1, tier 2) dynamic tier partitioning may be implemented as follows (tier 0=highest performing tier; tier 1=middle performance tier; and tier 2=lowest performing storage tier), the process may be implemented as shown in FIG. 8 and as set forth below.

First, the policies are checked to determine if the policies are consistent (810). Specifically, it may be possible that the policies specify allocations that are in excess of available capacity. Example consistency checks may be implemented as:

$$P_2^m = 100 - P_0^M - P_1^M$$

$$P_2^M = 100 - P_0^m - P_1^m$$

$$P_1^m \leq 100 - P_0^M$$

Specifically, the system will check to determine if the minimum allocation to tier 2 is equal to 100% minus the maximum allocation of both tiers 0 and 1. Likewise the system will check to determine if the maximum allocation to tier 2 is equal to 100% minus the minimum allocation of tiers 0 and 1. These two checks enable tier 2 to be allocated sufficient capacity regardless of the manner in which the upper tiers are used. Finally, the system will check to determine if the minimum allocation of the middle tier (tier 1) is less than or equal to 100% minus the maximum allocation to Tier 0. If the policies are not consistent, stop with error.

Assuming the policies pass the consistency check, the tier 0 promotion thresholds are calculated (820). Unlike the process set forth above, however, the allocation of capacity in the tiers is implemented such that each storage group will obtain at least some capacity in the storage tiers (in the event of contention for space in the storage tier) as specified in the minimum allocation policies $P^m$.

To calculate tier 0 promotion thresholds, if there is enough tier 0 capacity for minimal allocation, $S^T P^m_0 \leq T_0$ then $A^m_0 = P^m_0$. The allocation A, in this description, follows the same convention regarding subscripts/superscripts, in which the subscript denotes the storage tier and the subscript lower case m denotes the minimum allocation, e.g. $A^m_0$ is the minimum allocation for the highest level storage tier (tier 0). If there is insufficient space in the highest capacity storage tier (i.e. there is contention at that storage level) the allocation of storage between groups will be set to $$A_0^m = \frac{T_0}{S^T W_0} W_0.$$

Once the allocations are set, it is necessary to determine which extents (per storage group) are to be allocated space in the tier 0 storage tier. In one embodiment, this may be implemented using the following process:

a. Find minimum $x_{i0}$ such that $\int_{x_{i0}}^{\infty} h_i \leq A_{i0}^m S_i$, let $S_{i0}^m$ be corresponding minimal allocation. Let $$S_0^m = \sum_{i=1}^{N} S_{i0}^m.$$

b. Reset distribution $h_i(x)=0, x_{i0} \leq x \leq \infty$ c. Re-calculate total distribution:

$$h(.) = \sum_{i=1}^{N} h_i(.).$$

d. Find minimum $t_{i0}$ such that both $S_0^m + \infty_{t_{i0}}^\infty h \leq T_0$ and $S_{i0}^m + \int_{t_{i0}}^{x_{i0}} h_i \leq S_i P_{0i}^M$ for $i=1, \ldots, N$.

e. Let $t_{i_1 0}$ be the maximum of $t_{i0}$, $i=1, \ldots, N$. Then the tier 0 promotion threshold for storage group $i_1$ is set to $t_{i_1 0}$.

f. Re-calculate total distribution: $h(\bullet) = h(\bullet) - h_{i_1}(\bullet)$.

g. Find minimum $t_{i0}$ such that both $S_0^m + \int_{t_{i_1 10}}^{x_{i_1 10}} h_{i_1} + \int_{t_{i0}}^\infty h \leq T_0$ and $S_{i0}^m + \int_{t_{i0}}^{x_{i0}} h_i \leq S_i P_{0i}^M$ for $i=1, \ldots, N, i \neq i_1$.

h. Let $t_{i_2 0}$ be the maximum of $t_{i0}$, $i=1, \ldots, N, i \neq i_1$. Then the tier 0 promotion threshold for storage group $i_2$ is set to $t_{i_2 0}$.

i. Repeat steps f-h to find tier 0 promotion thresholds for all the remaining N−2 storage groups.

Once the tier 0 promotion thresholds have been calculated, the tier 1 promotion thresholds are calculated. To calculate tier 1 promotion thresholds, if there is enough tier 1 capacity for minimal allocation, $S^T P_1^m \leq T_1$ then $A_1^m = P_1^m$. If there is insufficient space in tier 1 (i.e. there is contention at that storage level) the allocation of storage between groups will be set to $A_1^m = (T_1/S^T W_1) W_1$.

The tier 1 promotion thresholds are then set using the same process (repeating steps a-i) set forth above using updated histograms: $h_i(x) = 0$, $t_{i0} \leq x \leq \infty$ and using priority weight vector.

After calculating the tier 1 promotion thresholds, the tier 2 demotion thresholds are calculated. If there is enough tier 2 capacity for minimal allocation, $S^T P_2^m \leq T_2$ then $A_2^m = P_2^m$ otherwise, set $$A_2^m = \frac{T_2}{S^T W_2} W_2.$$

The tier 2 demotion thresholds are then calculated using the process set forth below in connection with steps j-r:

j. Find maximum $x_{i2}$ such that $\int_0^{x_{i2}} h_i \leq A_{i2}^m S_i$, let $S_{i2}^m$ be corresponding minimal allocation. Let $$S_2^m = \sum_{i=1}^{N} S_{i2}^m.$$

k. Reset distribution $h_i(x) = 0, 0 \leq x \leq x_{i2}$ l. Re-calculate total distribution:

$$h(.) = \sum_{i=1}^{N} h_i(.).$$

m. Find maximum $t_{i2}$ such that both $S_2^m + \int_0^{t_{i2}} h \leq T_2$ and $S_{i2}^m + \int_{x_{i0}}^{t_{i0}} h_i \leq S_i P_{2i}^M$ for $i=1, \ldots, N$.

n. Let $t_{i_1 2}$ be the minimum of $t_{i2}$, $i=1, \ldots, N$. Then the tier 2 demotion threshold for storage group $i_1$ is set to $t_{i_1 2}$.

o. Re-calculate total distribution: $h(\bullet) = h(\bullet) - h_{i_1}(\bullet)$ p. Find maximum $t_{i2}$ such that both $S_2^m + \int_{x_{i_1 2}}^{t_{i_1 2}} h_{i_1} + \int_{t_{i0}}^\infty h \leq T_2$ and $S_{i2}^m + \int_{x_{i0}}^{t_{i0}} h_i \leq S_i P_{2i}^M$ for $i=1, \ldots, N, i \neq i_1$.

q. Let $t_{i_2 2}$ be the minimum of $t_{i2}$, $i=1, \ldots, N, i \neq i_1$. Then the tier 2 demotion threshold for storage group $i_2$ is set to $t_{i_2 2}$.

r. Repeat steps o-q to find tier 2 demotion thresholds for all the remaining N−2 storage groups.

Once the tier 2 demotion thresholds have been calculated, the tier 1 demotion thresholds are calculated by repeating steps j-r with updated histograms: $h_i(x) = 0, 0 \leq x \leq t_{i2}$ and using priority weight vector $W_1$. Note that promotions have higher priority than demotions and therefore only subset of demotions as accounted for when calculating the tier 2 and tier 1 demotion thresholds will take place. The reason for this is that an extent might satisfy both conditions for a promotion and a demotion in which case it will only be subjected to promotion.

To help explain application of this process, assume a set of policies:

$$P^M = P = \begin{bmatrix} 20 & 30 & 85 \\ 10 & 20 & 93 \end{bmatrix}$$

In this example, the policies specify that the storage volume of storage group 1 (first line of matrix) will be allocated 20% tier 0, 30% tier 1, and 85% tier 3; Similarly, the policy for storage group 2 is that it is able to be allocated at most 10% tier 0, 20% tier 1, and 93% tier 2.

Further, a minimal set of policies will be introduced which specify that, at a minimum, the storage groups will receive particular allocations in each of the storage tiers:

$$P^m = \begin{bmatrix} 5 & 10 & 50 \\ 2 & 5 & 70 \end{bmatrix}$$

In the illustrated example, storage group 1 is provided with a minimum allocation value of 5% in tier 0, 10% in tier 1, and 50% in tier 2. Storage group 2 is guaranteed a minimum of 2% in tier 0, 5% in tier 1, and 70% in tier 2. These two sets of policies satisfy the consistency requirements in step 1.

Let the priority weights be $$W = \begin{bmatrix} 2 & 2 & 1 \\ 1 & 1 & 2 \end{bmatrix}$$

Applying the distributed allocation process described above, the promotion allocations may be calculated as indicated in FIG. 9. Assuming the extents that are not designated for promotion are currently in tier 2, actual allocations, that is tier usages by storage groups divided by storage group sizes are $$A = \begin{bmatrix} 18.13 & 14.03 & 67.84 \\ 1.54 & 8.62 & 89.85 \end{bmatrix}$$

Figure 9A:
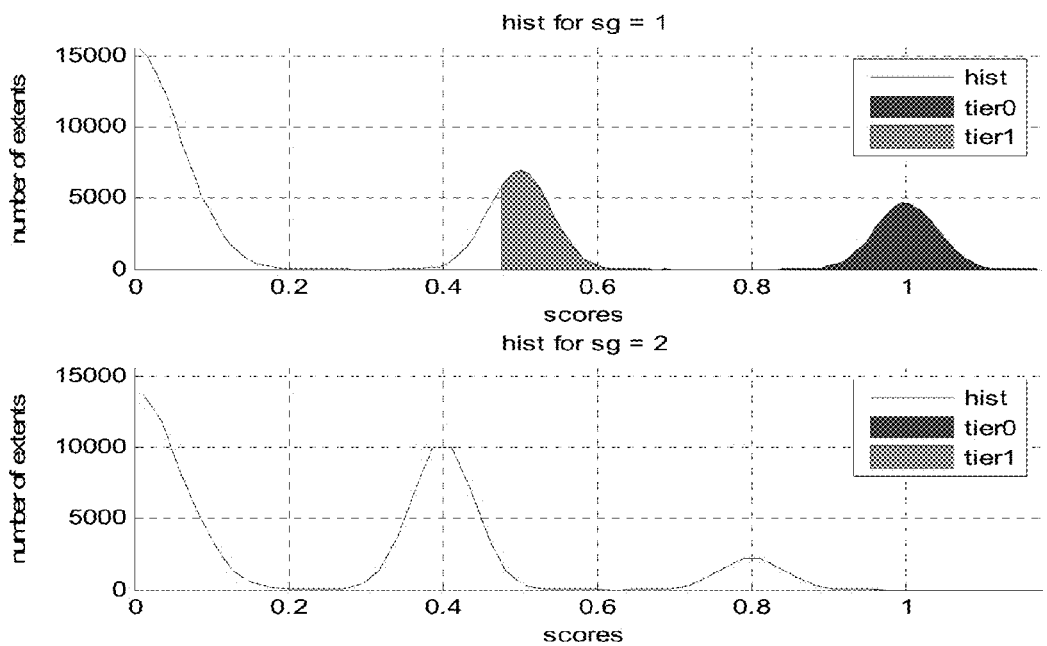
FIGS. 9A and 9B are graphs showing comparison of allocation of storage capacity to storage groups (promotion threshold calculations) using a normal allocation process (FIG. 9A) and using a dynamic allocation process (FIG. 9B)
Figure 9B:
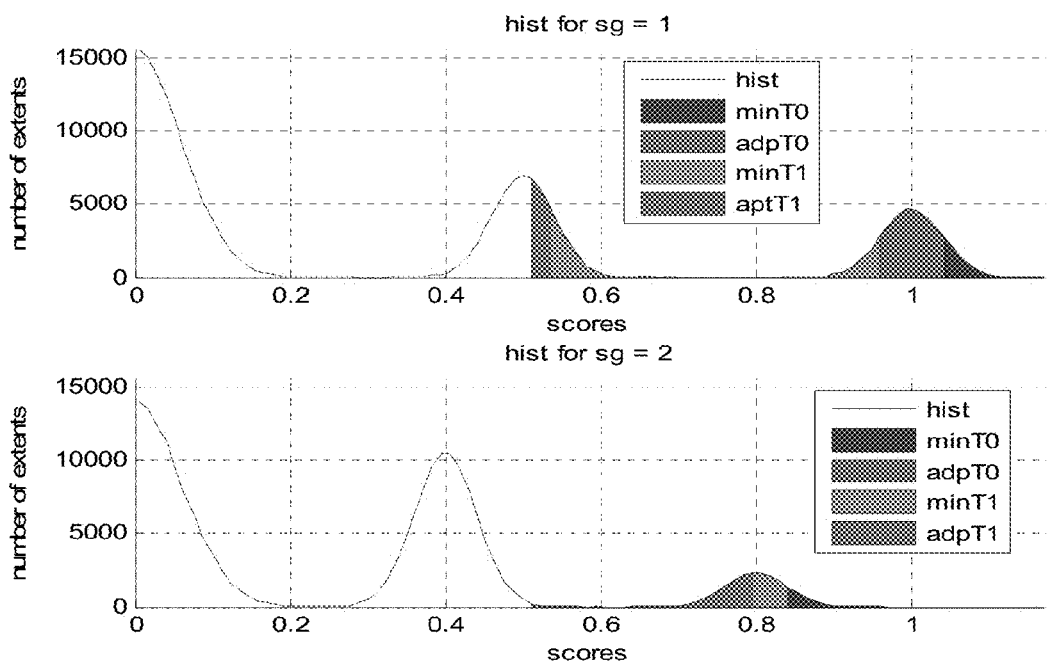

FIGS. 9A and 9B are graphs showing comparison of allocation of storage capacity to storage groups (promotion threshold calculations) using a normal allocation process (FIG. 9A) and using a dynamic allocation process (FIG. 9B).

Let T=[40000 50000 400000], S=[200000 200000]$^T$; each storage group has 200000 extents. Further, it will be assumed that the centers of activity densities are [0 0.5 1.0] for storage group 1 and [0 0.4 0.8] for storage group 2. Using the priority weights W=[2 1]$^T$, the activity densities around the center score of 0.5 for storage group 1 competes and wins against those around the center score of 0.8 for storage group 2. Applying a normal allocation process for promotions results in the allocations shown in FIG. 9A. As shown in FIG. 9A, using a normal allocation process, storage group 1 gets almost all the promotions while storage group 2 gets almost none.

As shown in FIG. 9B, the use of a distributed allocation process to allocate capacity results in storage group 2 getting half as much as storage group 1 in terms of minimal allocations for tier 0 and 1 and it continues to get some allocations in tier 1 due to a high activity density distribution around the center score of 0.8. So both prioritization and some level of fairness are achieved.

Figure 10A:
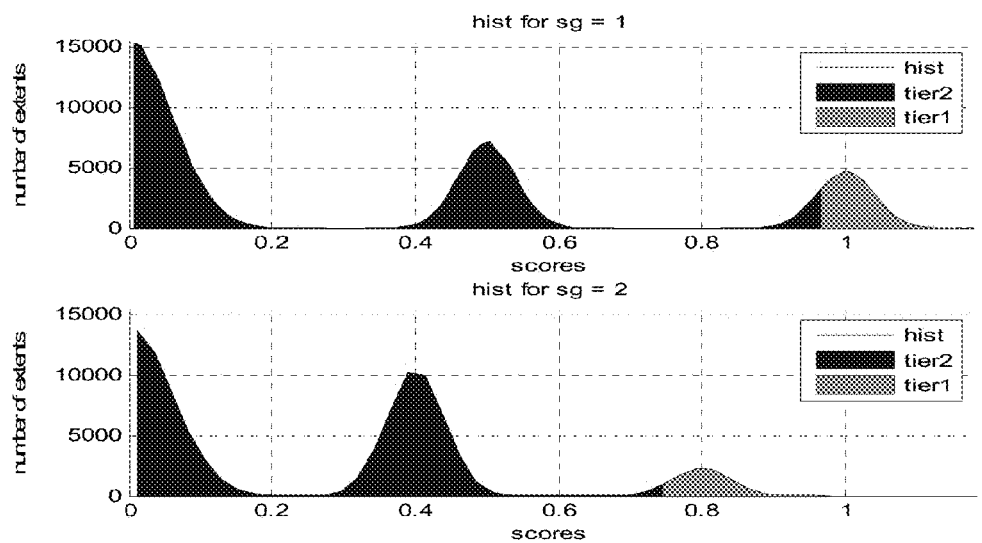
FIGS. 10A and 10B are histograms showing a comparison of allocation of storage capacity to storage groups (demotion threshold calculations) using a normal allocation process (FIG. 10A) and using a dynamic allocation process (FIG. 10B).
Figure 10B:
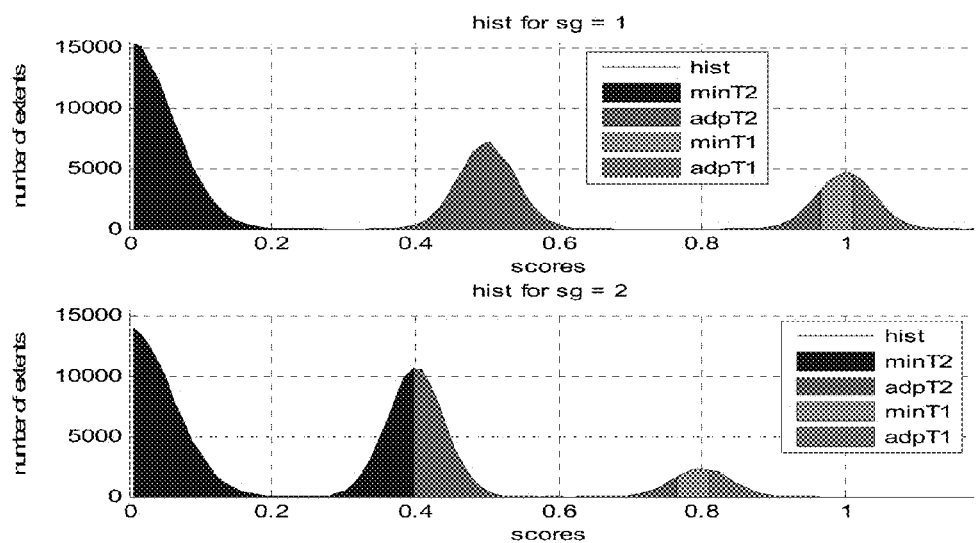

In order to complete the picture for demotions, FIG. 10A shows the demotion allocations using normal allocation process and FIG. 10B shows demotion allocations calculated using policies to specify both minimum and maximum allocations. As shown in FIG. 10B, the process that uses policies to specify both minimum and maximum allocations better allocates tier space between competing storage groups while allowing at least a minimum capacity to competing storage groups in the higher storage tiers. This enables multiple storage groups of different priorities to achieve the simultaneous goals of prioritization and fairness while preventing starvation.

The methods described herein may be implemented as software configured to be executed in control logic such as contained in a CPU of an electronic device such as a computer. In particular, the functions described herein may be implemented as sets of program instructions implemented utilizing programming techniques known to those of ordinary skill in the art that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling access to tiered shared storage, the method comprising the steps of:
    establishing a first set of storage policies identifying minimal allocation values for storage group access to at least a highest performing storage tier of tiered shared storage resources, a sum of the minimal allocation values exceeding the capacity of the highest performing storage tier;
    establishing a second set of storage policies identifying maximal allocation values for storage group access to tiered shared storage resources;
    establishing priority weights for storage groups;
    upon occurrence of contention for access to at the highest performing storage tier of the tiered shared storage, using the priority weights to adjust storage demands of the storage groups for access to the highest performing storage tier whenever the total minimal demand of all storage groups for access to the highest performing storage tier is greater than a capacity of the highest performing storage tier to establish minimum allocation values for storage groups in the highest performing storage tier, the minimum allocation values being different than the minimal allocation values established in the first set of storage policies;
    using the minimum allocation values to set threshold values for the storage groups to enable at least partial access by each storage group to the highest performing storage tier; and
    allocating storage resources other than the minimum allocation values using the second set of storage policies.

2. The method of claim 1, wherein the priority weights are not used to adjust activity density distributions.

3. The method of claim 1, further comprising the step of checking to determine if the first and second sets of storage policies are consistent.

4. The method of claim 1, wherein the minimum allocation values are used to guarantee that each storage group will obtain at least some capacity in the storage tiers identified by the first set of storage policies.

5. The method of claim 1, wherein the minimum allocations are based at least on capacity of the storage tier divided by demand for access to the storage tier times the policy weights for the storage groups.

6. The method of claim 1, wherein the minimum allocation values are used to allocate storage resources for a tier of the tiered shared storage system when the tier has sufficient capacity to satisfy aggregate demand from each of the storage groups.

7. The method of claim 1, wherein the step of using the minimum allocation values and allocating storage resources enables each storage group to obtain at least some storage capacity in each tier of the tiered storage system.

8. The method of claim 1, wherein the tiered shared storage is implemented using storage tiers for which a capital or operation cost per unit of input/output operation processing or per unit of storage capacity are different.

9. A non-transitory tangible computer readable storage medium having stored thereon a computer program for implementing a method of ensuring access a tiered storage system, the computer program comprising a set of instructions which, when executed by a computer, cause the computer to perform a method comprising the steps of:
    establishing a first set of storage policies identifying minimal allocation values for storage group access to at least a highest performing storage tier of tiered shared storage resources, a sum of the minimal allocation values exceeding the capacity of the highest performing storage tier;
    establishing a second set of storage policies identifying maximal allocation values for storage group access to tiered shared storage resources;
    establishing priority weights for storage groups;
    upon occurrence of contention for access to at the highest performing storage tier of the tiered shared storage, using the priority weights to adjust storage demands of the storage groups for access to the highest performing storage tier whenever the total minimal demand of all storage groups for access to the highest performing storage tier is greater than a capacity of the highest performing storage tier to establish minimum allocation values for storage groups in the highest performing storage tier, the minimum allocation values being different than the minimal allocation values established in the first set of storage policies;

using the minimum allocation values to set threshold values for the storage groups to enable at least partial access by each storage group to the highest performing storage tier; and allocating storage resources other than the minimum allocation values using the second set of storage policies.

10. The non-transitory tangible computer readable storage medium of claim 9, wherein the priority weights are not used to adjust activity density distributions.

11. The non-transitory tangible computer readable storage medium of claim 9, further comprising the step of checking to determine if the first and second sets of storage policies are consistent.

12. The non-transitory tangible computer readable storage medium of claim 9, wherein the minimum allocation values are used to guarantee that each storage group will obtain at least some capacity in the storage tiers identified by the first set of storage policies.

13. The non-transitory tangible computer readable storage medium of claim 9, wherein the minimum allocations are based on capacity of the storage tier divided by demand for access to the storage tier times the policy weights for the storage groups.

14. The non-transitory tangible computer readable storage medium of claim 9, wherein the minimum allocation values are used to allocate storage resources for a tier of the tiered shared storage system when the tier has sufficient capacity to satisfy aggregate demand from each of the storage groups.

15. The non-transitory tangible computer readable storage medium of claim 9, wherein the step of using the minimum allocation values and allocating storage resources enables each storage group to obtain at least some storage capacity in each tier of the tiered storage system.

16. The non-transitory tangible computer readable storage medium of claim 9, wherein the tiered shared storage is implemented using storage tiers for which a capital or operation cost per unit of input/output operation processing or per unit of storage capacity are different.

\* \* \* \* \*